United States Patent Office 3,392,120
Patented July 9, 1968

3,392,120
DRY DETERGENT MIXTURES
Ewald H. Krusius, South River, N.J., and Russell R. Keast, Yardley, Pa., assignors to FMC Corporation, New York, N.Y., a corporation of Delaware
No Drawing. Filed Mar. 19, 1964, Ser. No. 353,253
2 Claims. (Cl. 252—135)

ABSTRACT OF THE DISCLOSURE

The bulk density of dry mixtures of alkali metal phosphates and anionic and nonionic synthetic detergents is reduced by agitating the mixtures with a water-dispersible copolymer of acrylic acid and polyallyl sucrose. The bulk densities of the mixtures following the treatment approximate those of products prepared by spray-drying techniques.

---

This invention is concerned with dry detergent mixtures, and aims to provide a novel means for controlling the bulk density of such detergent mixtures.

In the detergent industry, the various synthetic detergents are generally marketed to the public as compounded mixtures of "built" detergents. The syndet is generally blended with an alkali metal polyphosphate, very often with other alkali metal salts, and most often with an antisoil redeposition agent such as carboxymethylcellulose and some optical brightener. Such mixtures very often compact down in manufacture to yield a final product of substantially higher bulk density than is desired for various reasons, including ease of solubility and physical appearance. It has been the practice, in the detergent industry, to produce products of lower bulk density by spray drying wet detergent mixtures. Obviously, if this expensive operation could be avoided, a considerable savings in cost could result.

We have now found that the bulk densities of mixtures of syndets and polyphosphates can be materially reduced by simple mixing in the presence of 0.1% or more of certain water dispersible copolymers of acrylic acid crosslinked with about 0.75% to about 1.5% of polyallyl sucrose, together with 1.5 to 5% of water.

We do not know the nature of the mechanism involved in this surprising discovery; but this simple mixing produces bulk densities which approximate those obtained in the expensive and time-consuming spray-drying process previously used to yield detergent mixtures with low bulk densities.

The polymers useful in this invention are described in the Brown U.S. Patent 2,798,053, and are the copolymers of acrylic acid with low percentages (0.75 to 1.5%) of polyallyl sucrose, whereby the resultant copolymers are readily dispersible in water. The polyallyl surcrose preferably contains about 5 to 8 allyl groups per sucrose molecule, and can be prepared in accordance with Example 1 of said Brown patent; the copolymer can be prepared in accordance with Example 2 of said patent.

An example of a specific product so prepared is a product designated by the trademark "Carbopol-934." This product is a colloidally water-soluble polymer of acrylic acid crosslinked with approximately 1% by weight of allyl sucrose, the latter material having an average of about 5.8 allyl groups per molecule. This product is prepared by mixing the acrylic acid monomer and the allyl sucrose in the presence of a toluene diluent and 1% of benzoyl peroxide and the reaction allowed to proceed to completion at which time the diluent, together with unreacted monomer and catalyst, is removed by filtration and subsequent volatilization from the solid polymeric residue. The polymer thereby obtained is in the form of a white powder having a maximum particle size of 10 mesh and a bulk density of about 12 pounds per cubic foot. The exact molecular weight is, of course, unknown but analysis shows that the product has an equivalent weight (molecular weight per repeating unit) of about 77. The minimum molecular weight, as roughly determined from viscosity measurements, is probably about 200,000.

In using the copolymers, we have found that as little as 0.5% will produce a marked lowering of bulk density, when used with about 1.5 to 5% of water. Results are improved with added quantities. We have used up to 3.0%, but since no substantial improvement is obtained over about 0.3% of added copolymer, the economic range is 0.05 to 0.3%.

It should be noted that the fluffing action of the copolymer-water addition is very rapid; the fluffing action is effective within a minute in a simple planetary mixer. Prolonged mixing will increase the bulk density; but overmixed products with high bulk densities can be refluffed simply by adding water within the desired range and remixing for a short time. This indicates that water (which presumably is either evaporated or hydrated with some ingredient on prolonged mixing) is an essential operative element in the fluffing action.

The following typical examples are intended to be illustrative of but not limiting to, our invention.

Example 1.—Simple mixture

The following formulation was made up by mixing the dry ingredients preheated to 110° C. in a Kitchen-Aid (Planetary) Mixer, over a three-minute addition period of the DDBSA, also preheated to 110° C.:

|  | Parts |
|---|---|
| Sodium tripolyphosphate | 175 |
| Sodium bicarbonate | 150 |
| DDBSA (88% dodecylbenzene sulfonic acid) | 175 |
| Total | 500 |

The loose bulk density of this mix, when cool, was 0.549 g./ml. To 410 grams of this mix at room temperature (70° F.) was added:

2% water (8.2 grams) plus 0.2% Carbopol 934 (0.82 gram). After one minute mixing in the Kitchen-Aid, the loose density was 0.42 gm./ml. After thirty minutes mixing in the Kitchen-Aid, the loose density was 0.586 gm./ml. After ninety minutes mixing in the Kitchen-Aid, the loose density was 0.612 gm./ml. When the final product after ninety minutes mixing was treated with 2½% water, and mixed for one minute in the Kitchen-Aid (Planetary) Mixer, the loose bulk density was restored to 0.420 gm./ml.

Example 2.—Formulated mixed detergent

|  | Parts |
|---|---|
| Sodium tripolyphosphate light density | 185 |
| Sodium bicarbonate powder | 152 |
| Carboxymethylcellulose | 2½ |
| Tinopal 4BM Conc. (optical bleach) | ½ |
| Sodium metasilicate anhydrous | 20 |
| Dodecylbenzene sulfonic acid (88%) | 140 |
| Total | 500 |

The ingredients were preheated to 110° C. and mixed in a Kitchen-Aid (Planetary) Mixer for one minute. After cooling, the loose bulk density was 0.522 gram per milliliter. After addition of 0.2% Carbopol 934, plus 2% water, with one minute mixing, the loose bulk density was 0.452 gm./ml. After addition of 0.2% Carbopol 934, plus 4% water, the loose bulk density was 0.437 gm./ml.

After addition of 0.3% Carbopol 934, plus 5% water, the loose bulk density was 0.430 gm./ml.

While the invention has been illustrated with respect to one surfactant and one polyphosphate, similar runs have been made over a wide range of polyphosphates and surfactants. The fluffing phenomenon was observed in formations utilizing a wide range of both anionic and nonionic surfactants, and combined with a large variety of polyphosphates, and appears in all such combinations tested.

The anionic nonsoap synthetic detergents may be designated as water soluble salts or organic sulfuric reaction products having in their molecular structure an alkyl or acyl radical of carbon atom content within the range of about 8 to about 18 and a sulfonic acid or a sulfuric acid ester radical. Important examples of these anionic detergents are: sodium or potassium alkyl benzene sulfonate in which the alkyl group contains from about 9 to about 15 carbon atoms in either a straight chain or a branched chain which is derived from polymers of propylene, sodium and potassium alkyl glyceryl ether sulfonates, especially those ethers of higher fatty alcohols derived from the reduction of coconut oil; the reaction product of higher fatty acids with sodium or potassium isethionate, where, for example, the fatty acids are derived from coconut oil; sodium or potassium alkyl sulfonates and sulfates, especially those alkyl sulfates derived by the sulfation of coconut or tallow fatty alcohols and mixtures of such alkyl sulfates; dialkyl esters of sodium or potassium salts of sulfosuccinic acid, for example, the dihexyl ester; sodium and potassium salts of sulfated or sulfonated monoglycerides derived, for example, from coconut oil; sodium or potassium salts of the higher fatty alcohol esters of sulfocarboxylic acids, for example, the sodium salt of the lauryl alcohol ester of sulfoacetic acid; sodium or potassium salts of a higher fatty acid amide of methyl taurine in which the higher acyl radicals for example, are derived from coconut oil; and others known in the art a number being specifically set forth in U.S. Patent 2,486,921, issued to Byerly on Nov. 1, 1949. Examples of other useful anionic nonsoap synthetic detergents are acyl sarcosinates, e.g., sodium N-lauroyl sarcosinate. The sodium alkyl benzene sulfonates in which the alkyl group contains about 9 to about 15 carbon atoms are preferred in the practice of this invention.

Nonionic nonsoap synthetic detergents may be broadly classed as being constituted of a water solubilizing polyoxyethylene group in chemical combination with an organic hydrophobic compound such as polyoxypropylene, alkyl phenol, the reaction product of an excess of propylene oxide and ethylene diamine, and aliphatic alcohols. The nonionic synthetic detergents have a molecular weight in the range of from about 800 to about 11,000.

For example, a well known class of nonionic detergents is made available on the market under the trade name of "Pluronic." These compounds are formed by condensing ethylene oxide with a hydrophobic base formed by the condensation of propylene oxide with propylene glycol. The molecular weight of the hydrophobic base is of the order of 1,500 to 1,800. The addition of polyoxyethylene radicals to this hydrophobic base increases the water solubility of the entire molecule. Liquid products are obtained up to the point where the polyoxyethylene content is about 50% of the total weight of the condensation product; higher proportions of polyoxyethylene render the products solid in consistency. The molecular weights of Pluronic L61, L64, and F68, for example, are approximately 2,000, 3,000 and 8,000 respectively.

Examples of other nonionic synthetic detergents useful in the present invention are: condensation products of 6 to 30 moles of ethylene oxide with one mole of an alkyl phenol containing 6 to 12 carbon atoms, either in a straight or branched chain, in the alkyl group (e.g., nonyl or octylphenol); condensation products of 6 to 30 moles of ethylene oxide with one mole of an aliphatic straight or branched chain alcohol containing 8 to 18 carbon atoms (e.g., lauryl alcohol or tallow fatty alcohol); condensation products of ethylene oxide and the reaction product of propylene oxide and ethylene diamine wherein the reaction product has a molecular weight of 2,500–3,000, for example and the condensation product has a polyoxyethylene content of 40% to 80%.

Specific polyphosphates tested include sodium tripolyphosphate, tetrasodium pyrophosphate, and the so-called phosphate glasses, including sodium hexametaphosphate, with chain lengths of approximately ten to sixteen preferably. Obviously, other surfactants of these classes, and other polyphosphates, will behave in similar fashion.

We claim:

1. A method of fluffing and reducing the bulk density of a dry, powdered mixture of an alkali metal polyphosphate and a synthetic detergent of the class consisting of anionic and nonionic detergents, which comprises preparing a mixture of said polyphosphate and said synthetic detergent, adding 0.05 to 3% of a water-dispersible copolymer of acrylic acid crosslinked with 0.75 to 1.5% of polyallyl sucrose, and from 1.5 to 5% of water to said mixture and agitating the mixture resulting therefrom for at least 1 minute and for a time sufficient to reduce the bulk density of said mixture, and insufficient to raise its bulk density to its initial value.

2. The method of claim 1 in which the alkali metal polyphosphate is sodium tripolyphosphate, and the water-dispersible copolymer of acrylic acid crosslinked with 0.75 to 1.5% of polyallyl sucrose is employed in the amount of 0.05 to 0.3%.

References Cited

UNITED STATES PATENTS

| | | | |
|---|---|---|---|
| 2,798,053 | 7/1957 | Brown | 252—89 XR |
| 3,178,370 | 4/1965 | Lkenfuss | 252—137 |
| 3,247,123 | 4/1966 | Schrager et al. | 252—135 |
| 3,277,013 | 10/1966 | Gianladis | 252—153 |

LEON D. ROSDOL, *Primary Examiner.*

B. BETTIS, A. T. MEYERS, *Assistant Examiners.*

UNITED STATES PATENT OFFICE
CERTIFICATE OF CORRECTION

Patent No. 3,392,120                             July 9, 1968

Ewald H. Krusius et al.

It is certified that error appears in the above identified patent and that said Letters Patent are hereby corrected as shown below:

Column 2, line 10, "0.5%" should read -- 0.05% --. Column 3, line 12, "or" should read -- of --.

Signed and sealed this 24th day of February 1970.

(SEAL)
Attest:

Edward M. Fletcher, Jr.                      WILLIAM E. SCHUYLER, JR.
Attesting Officer                              Commissioner of Patents